May 19, 1964  J. R. COLHOUER  3,133,665

RESILIENT FASTENERS FOR CONTAINER LIDS

Filed Aug. 9, 1962

John R. Colhouer
INVENTOR

United States Patent Office 3,133,665
Patented May 19, 1964

3,133,665
RESILIENT FASTENERS FOR CONTAINER LIDS
John R. Colhouer, 1398 Raven Drive, Pittsburgh 16, Pa.
Filed Aug. 9, 1962, Ser. No. 215,351
2 Claims. (Cl. 220—55.7)

This invention relates to fastening devices for retaining lids on containers, and more particularly to a device for the purpose of securing in place the lid of a refuse container or the like.

General objects of the invention are to provide a lid fastener which is economical to fabricate on a mass production basis; is sturdy and durable, being capable of a long service life of severe usage; is convenient to attach and remove; will retain the lid in place under adverse conditions; will form an effective, flexible hinged connection between lid and container when desired; and will be easy to clean.

A more specific object of the invention is to provide an efficient fastener for the purpose of securing a lid on a refuse container or the like in order to prevent the contents from being spilled if the container is knocked over on its side or turned upside down.

Another object of the invention is to provide a fastener that will resist the efforts of small children or prowling animals to remove the lid from the container.

Another object of the invention is to provide a fastener of one-piece, resilient construction that will be simple and convenient to attach and remove from the lid and the container.

Another object of the invention is to provide a fastener of such simple construction that it can be easily and repeatedly cleaned for sanitary reasons.

A further object of the invention is to provide a flexible, hinged connection between lid and container, thereby retaining the lid within easy reach when lid is removed for loading the container.

The invention accordingly comprises the features of construction and combination of elements which will be exemplified in the construction hereinafter set forth, and the scope of the invention will be indicated in the claims.

For a further understanding of the nature and objects of the invention, reference should be had to the following detailed description taken in connection with the accompanying drawings, in which.

Figure 1:
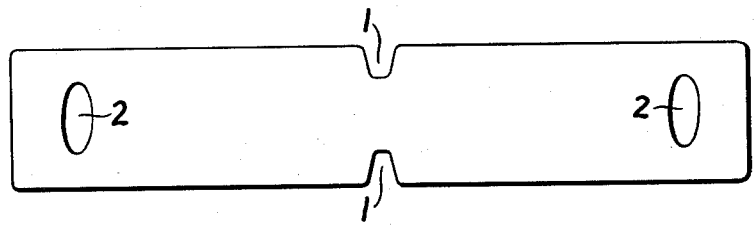
FIG. 1 is a plan view of a preferred embodiment of the invention.
Figure 2:
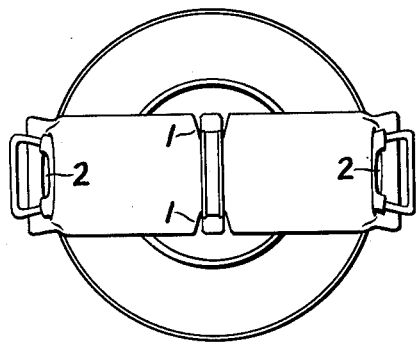
FIG. 2 is a plan view of the invention, illustrating its use in retaining the lid on a typical refuse container.

Referring to the drawings, in which like numerals identify similar parts throughout, it will be seen from FIGS. 1 and 2 that an embodiment of the lid fastener may comprise a single piece of substantially flat resilient material of substantially rectangular form, of sufficient length to be laid horizontally across the center point of the container lid and, with the lid in place on the container, to extend downward vertically over the sides of the container, terminating at a convenient position in relation to the pivot point of the side handles of the container. The lid fastener is of a lateral dimension greater than the width of the aperture formed by the lid handle of a typical refuse container. At mid-point of the length of the lid fastener, extending laterally inward from each longitudinal edge, is a notch 1, of sufficient width and depth to accommodate the girth of the lid handle when the notch 1 and the appropriate inside vertical face of the lid handle are placed in juxtaposition.

At a convenient position near each of the opposite ends of the lid fastener is a hole 2, preferably substantially oval in shape; large enough to slip around and over the side handle of the container when the resilient material of the fastener is stretched manually at that point, yet small enough to firmly enclose and grip the handle at its pivot point on the container when traction on the resilient material is released.

In operation of the embodiment of the device to achieve the position as illustrated in FIG. 2, the operator may grasp one end of the lid fastener and pass it through the aperture formed by the lid handle of a typical refuse container, pulling the fastener through until notches 1, 1, engage the inner face of the sides of the lid handle. Each of the two ends of the fastener may then be grasped and stretched downward on opposite sides of the container and pressed firmly against the outer edge of the appropriate side handle until the handle is forced through the hole 2 placed near each end of the fastener for that purpose. When the end of the fastener has been seated at the pivot point of the handle, traction is then released. When both ends of the fastener are thus situated, the container lid is held firmly in place by the force of tension exerted by the resilient fastener against the opposing angle of each side handle of the container. The fastener will remain in this position unless traction of sufficient force is exerted, downward and outward from the pivot point of the side handle of the container, to permit the fastener to be passed over the handle and released. The amount of force of traction required and the degree of skill and muscular coordination needed to unseat and release the end of the fastener from the side handle will effectively resist the efforts of small children or prowling animals to remove the lid from the container. The same safeguards will prevent the lid from being dislodged accidentally if the container is knocked over, rolled on its side or turned over completely.

Figure 3:
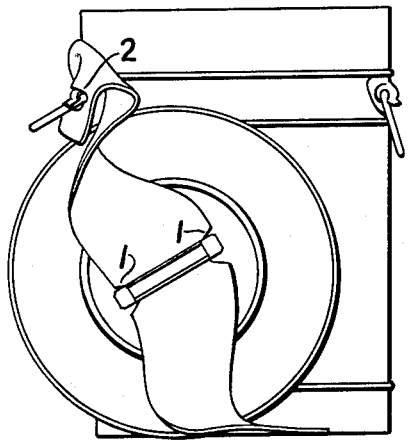
FIG. 3 is a side elevational view of a typical refuse container, with fastener attached at one end, illustrating its use as a hinge.

It will be seen from FIG. 3 that when only one end of the fastener is entirely freed from its seated position in relation to the side handle of the container, while the other end of the fastener remains secured to its respective handle, that the notches 1, 1, at the mid-point of the fastener will continue to engage the lid handle, thereby retaining the lid and the fastener in their relative position to each other and thus forming a flexible hinged connection between lid and container.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrations and not in a limiting sense.

It is also to be understood that the following claims are intended to cover all of the generic and specific features of the invention herein described, and all statements of the scope of the invention which, as a matter of language, might be said to fall in between.

Having described my invention, what I claim as new and desire to secure by Letters Patent is:

1. A fastening device comprising a substantially flat, substantially rectangular piece of resilient material having a hole near each end for the purpose of engaging the side handles of a container of appropriate design and having a notch extending laterally inward at the center of each longitudinal edge for the purpose of engaging the handle of the lid of said container.

2. A fastener device for use in combination with a refuse container which itself comprises an essentially cylindrical upright tank having side handles externally thereof at opposed sites on the said tank and also having a generally horizontally disposed removable lid possessing a central handle, the said fastener device comprising:

a normally flat band of resilient material having a side-handle-receiving-hole near each end thereof which is adapted to receive one of the said side handles of the said tank; the said band having a normal width greater than the width of the said central handle; a notch in each edge of the said band at the central portion thereof providing a necked-down portion of the said band which has less width than the said central handle;

whereby the said band is relatively secured to the said lid by means of engagement of the said necked-down portion within the said lid handle, and whereby the said band is stretched between the said side-handle-receiving-holes and the said band is in engagement with the upper surface of the said lid.

References Cited in the file of this patent
UNITED STATES PATENTS

| | | |
|---|---|---|
| 2,155,329 | Perdue | Apr. 18, 1939 |
| 2,998,276 | Shettler | Aug. 29, 1961 |